(12) United States Patent
Glugla et al.

(10) Patent No.: US 11,255,284 B2
(45) Date of Patent: Feb. 22, 2022

(54) SYSTEMS AND METHODS FOR CATALYST HEATING DURING COLD-START WITH AN ACTIVE PRE-CHAMBER

(71) Applicant: Ford Global Technologies, LLC, Dearborn, MI (US)

(72) Inventors: Chris Paul Glugla, Macomb, MI (US); Michael Damian Czekala, Canton, MI (US); Michael Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/801,561

(22) Filed: Feb. 26, 2020

(65) Prior Publication Data
US 2021/0262408 A1 Aug. 26, 2021

(51) Int. Cl.
*F02D 41/02* (2006.01)
*F02B 1/06* (2006.01)
*F01N 3/20* (2006.01)
*F02D 41/06* (2006.01)

(52) U.S. Cl.
CPC ......... *F02D 41/0255* (2013.01); *F01N 3/204* (2013.01); *F02B 1/06* (2013.01); *F02D 41/064* (2013.01)

(58) Field of Classification Search
CPC ...... F02D 41/0255; F02D 41/064; F02B 1/06; F01N 3/204
See application file for complete search history.

(56) References Cited

U.S. PATENT DOCUMENTS

| 4,901,687 | A | | 2/1990 | Jones | |
|---|---|---|---|---|---|
| 5,454,356 | A | * | 10/1995 | Kawamura | F02D 41/401 |
| | | | | | 123/254 |
| 5,727,384 | A | * | 3/1998 | Ma | F01N 3/204 |
| | | | | | 60/284 |
| 6,293,095 | B1 | | 9/2001 | Yamamoto et al. | |
| 8,146,555 | B2 | | 4/2012 | Solomon et al. | |
| 8,925,518 | B1 | * | 1/2015 | Riley | F02B 19/1057 |
| | | | | | 123/261 |
| 9,353,674 | B2 | * | 5/2016 | Bunce | F02B 19/12 |
| 9,909,523 | B1 | * | 3/2018 | Glugla | F02D 41/062 |
| 10,018,104 | B2 | | 7/2018 | Grover, Jr. et al. | |
| 10,400,696 | B2 | * | 9/2019 | Blaxill | F02P 13/00 |

(Continued)

OTHER PUBLICATIONS

Glugla, C., "Systems and Methods for Adjusting Fueling in a Cylinder With a Pre-Chamber," U.S. Appl. No. 16/719,726, filed Dec. 18, 2019, 56 pages.

(Continued)

*Primary Examiner* — Carl C Staubach
(74) *Attorney, Agent, or Firm* — Geoffrey Brumbaugh; McCoy Russell LLP

(57) ABSTRACT

Methods and systems are provided for operating a cylinder of an engine including a pre-chamber ignition system during a cold start condition. In one example, a method may include performing a post-injection in the cylinder, and then performing a pre-chamber combustion during an exhaust stroke of the cylinder. In this way, a temperature of a catalyst of the engine may be increased, which may decrease vehicle emissions during the cold start condition.

16 Claims, 6 Drawing Sheets

(56) References Cited

U.S. PATENT DOCUMENTS

| | | | |
|---|---|---|---|
| 2007/0215130 A1* | 9/2007 | Shelby | F02D 19/084 123/637 |
| 2011/0251743 A1* | 10/2011 | Hu | F02B 29/0443 701/22 |
| 2015/0075492 A1* | 3/2015 | Glugla | F02D 41/0027 123/349 |
| 2018/0094597 A1* | 4/2018 | Guo | F02D 41/22 |
| 2018/0135506 A1* | 5/2018 | Grover, Jr. | F02B 19/12 |

OTHER PUBLICATIONS

Glugla, C., "Systems and Methods for Fouling Reduction in a Pre-Chamber," U.S. Appl. No. 16/788,485, filed Feb. 12, 2020, 57 pages.

* cited by examiner

SYSTEMS AND METHODS FOR CATALYST HEATING DURING COLD-START WITH AN ACTIVE PRE-CHAMBER

FIELD

The present description relates generally to methods and systems for engines having a pre-chamber system.

BACKGROUND/SUMMARY

An internal combustion engine combusts an air-fuel mixture within cylinders to produce torque, which may be used to propel a vehicle. In some such engines, an ignition spark is used to ignite the air-fuel mixture within each cylinder during a compression stroke. For example, each cylinder may include a spark plug for directly igniting the air-fuel mixture within the cylinder. In other examples, the air-fuel mixture within the cylinder may be ignited by jets of hot gas and flame from a pre-combustion chamber, referred to herein as a pre-chamber. The pre-chamber may be a walled chamber located in a clearance volume of the cylinder and may include a spark plug, an 02 or air injector, and a fuel injector. During engine operation, a first air-fuel mixture is introduced into the pre-chamber, and a second air-fuel mixture is introduced into the cylinder. When ignition is indicated, the spark plug in the pre-chamber actuates, igniting the first air-fuel mixture. As the first air-fuel mixture combusts, jets of flame and hot gas may exit the pre-chamber and enter the cylinder via one or more holes in the pre-chamber walls. These jets ignite the second air-fuel mixture in the cylinder air-fuel to produce torque.

Pre-chamber ignition may offer performance and efficiency increases during some operating conditions. For example, a cylinder with pre-chamber ignition may operate with a higher (e.g., leaner) air-fuel ratio (AFR), which may lead to lower fuel consumption in the cylinder with pre-chamber ignition. In other examples, a cylinder with pre-chamber ignition may produce more power due to an increased burn rate in the cylinder.

However, pre-chamber operation may present issues when engine temperatures are low relative to nominal operating temperatures, a condition referred to herein as a "cold start" condition. In particular, during a cold start or warm-up condition, an emissions control device, such as a three-way catalyst or a selective catalytic reduction (SCR) device, or the like, may not efficiently reduce emissions generated by engine operation. In particular, an emissions control device may not operate efficiently until sufficient contact with hot exhaust gases raises the emissions control device to a threshold operating temperature (e.g., a catalyst light off temperature). As an example, a relatively large percentage of vehicle emissions may occur in a short interval after a cold start before the catalyst light off temperature is reached.

The inventors herein have identified the above-mentioned issues and have identified a method to at least partially address them. In one example, the issues described above may be addressed by a method for, during a cold start condition, injecting an amount of post-injection fuel in a cylinder during an exhaust stroke of the cylinder, the amount based on an air-fuel ratio (AFR) of a first pre-chamber air-fuel mixture and an AFR of a first cylinder air-fuel mixture. In this way, a temperature of an emissions control device may be increased after a cold start, as post-injection fuel generates additional heat in the exhaust gas while maintaining overall stoichiometry between the pre-chamber AFR, the cylinder AFR, and the amount of post-injection fuel.

As one example, the method may further comprise combusting the first pre-chamber air-fuel mixture in a pre-chamber during a compression stroke of the cylinder to ignite the first cylinder air-fuel mixture; and combusting a second pre-chamber air-fuel mixture in the pre-chamber during the exhaust stroke of the cylinder. For example, combusting an air-fuel mixture in the pre-chamber of the cylinder may include injecting air to the pre-chamber via a pre-chamber air-injector, injecting fuel to the pre-chamber via a pre-chamber fuel injector; and igniting the resulting air-fuel mixture by actuating a pre-chamber spark plug. For example, igniting an air-fuel mixture in the pre-chamber may cause jets of hot gas and flame to ignite an air-fuel mixture in the cylinder. As an example, the amount of air injected to the pre-chamber and the amount of fuel injected to the pre-chamber may be individually adjusted, which may change an AFR of the resulting air-fuel mixture. In particular, the first pre-chamber air-fuel mixture may be richer than the first cylinder air-fuel mixture. Further, injecting the amount of post-injection fuel in the cylinder during the exhaust stroke of the cylinder includes injecting fuel into the cylinder via a cylinder fuel injector. As an example, the exhaust gas from each combustion cycle may be stoichiometric (e.g., may be within 5% of stoichiometry).

As another example, the cold start condition may be indicated in response to a duration after an engine start. For example, a cold start condition may be indicated after a pre-determined amount of time after the engine start. As another example, the cold start condition may be indicated responsive to a number of crankshaft revolutions after the engine start increasing above a threshold number of crankshaft revolutions. In this example, the cold start condition is indicated based on an engine position. In yet another example, the cold start condition is indicated responsive to a catalyst temperature decreasing below a threshold catalyst temperature. For example, when a catalyst temperature decreases below a threshold catalyst temperature, it may not operate efficiently. Thus, when the catalyst temperature drops below the threshold catalyst temperature, the cold start condition may be indicated in order to increase the catalyst temperature.

In this way, a temperature of a catalyst may be increased during a cold start condition. By increasing the temperature of the catalyst during the cold start condition, the catalyst may operate more efficiently, which may result in reduced engine emissions during the cold start condition.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
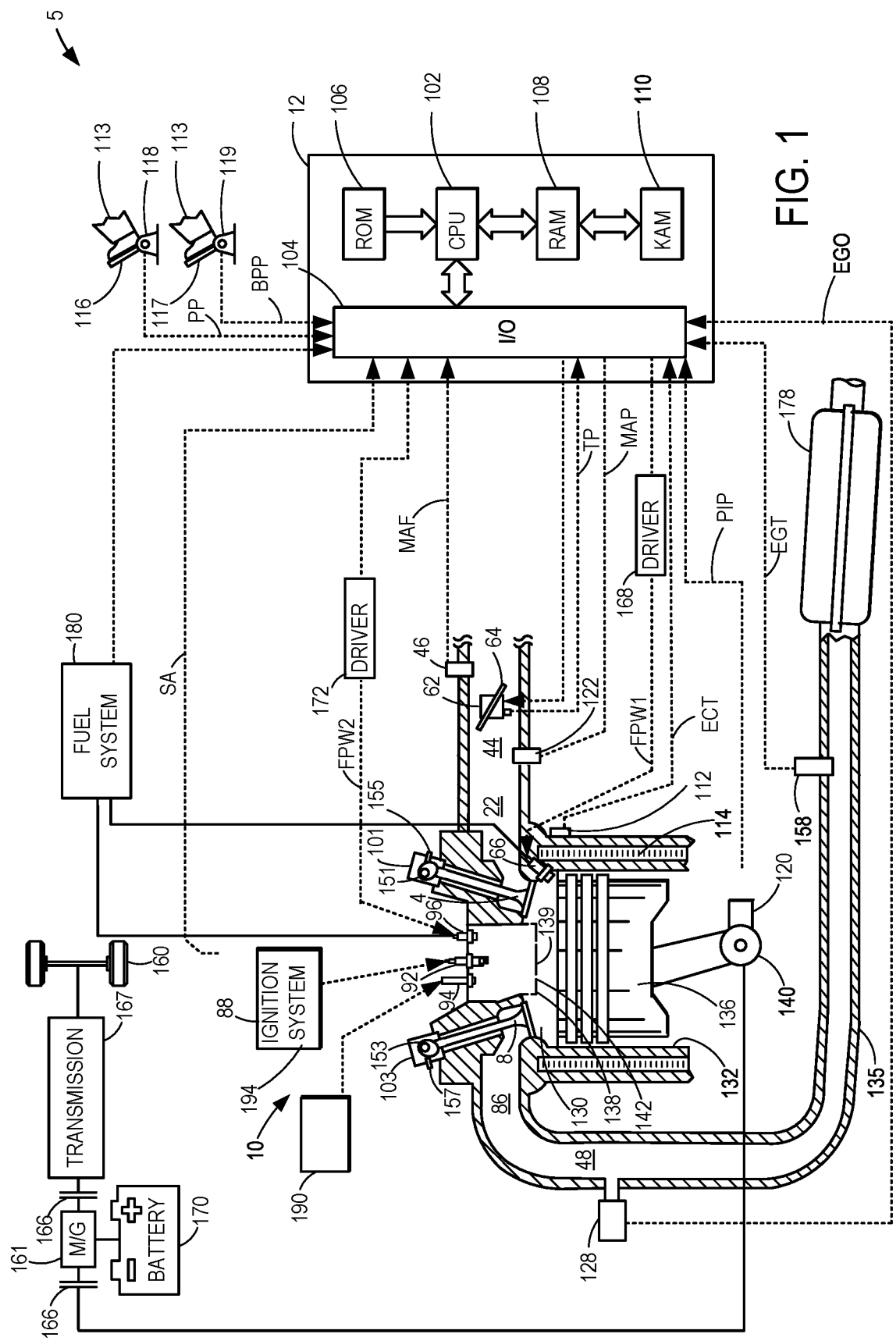
FIG. 1 shows a schematic depiction of a cylinder configuration in a pre-chamber ignition engine system of a vehicle.
Figure 4A:
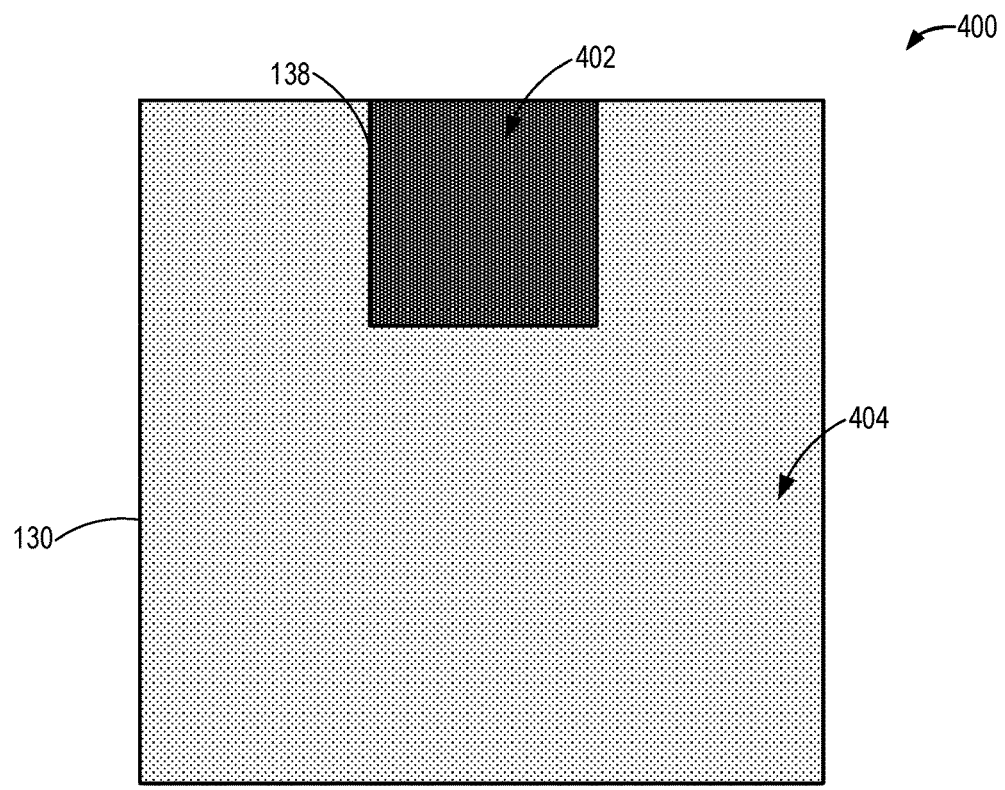
FIG. 4A shows a schematic depiction of pre-chamber and cylinder gases prior to combustion.
Figure 4B:
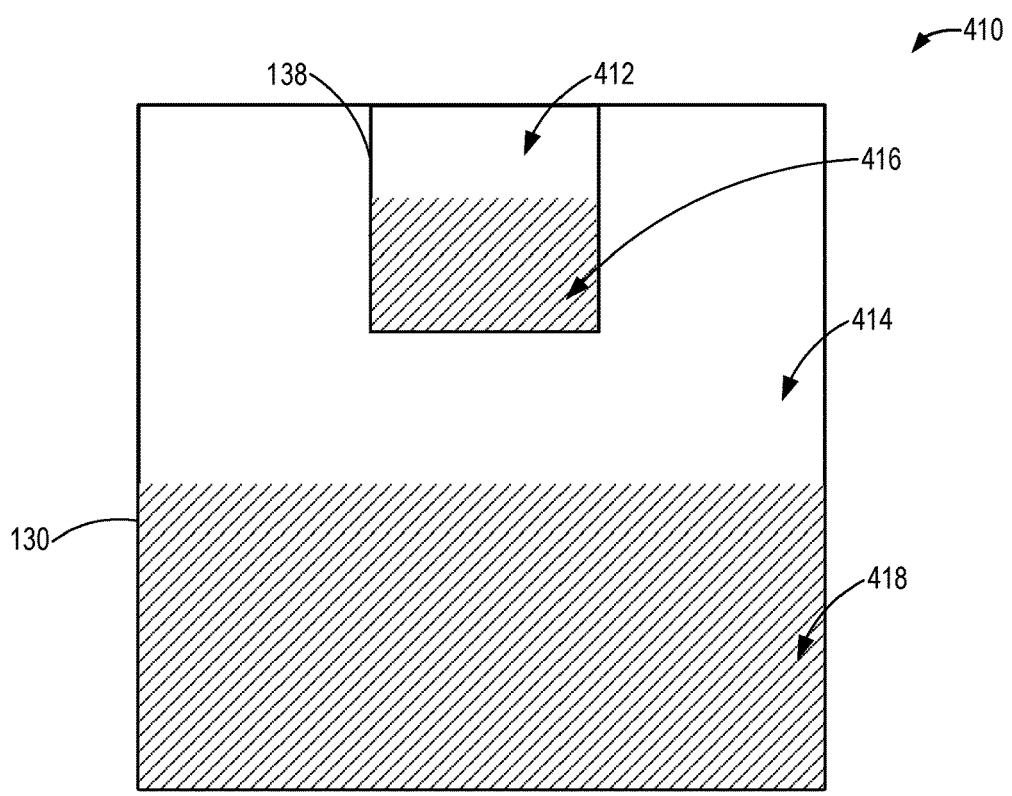
FIG. 4B shows a schematic depiction of pre-chamber and cylinder gases prior after combustion.
Figure 5:
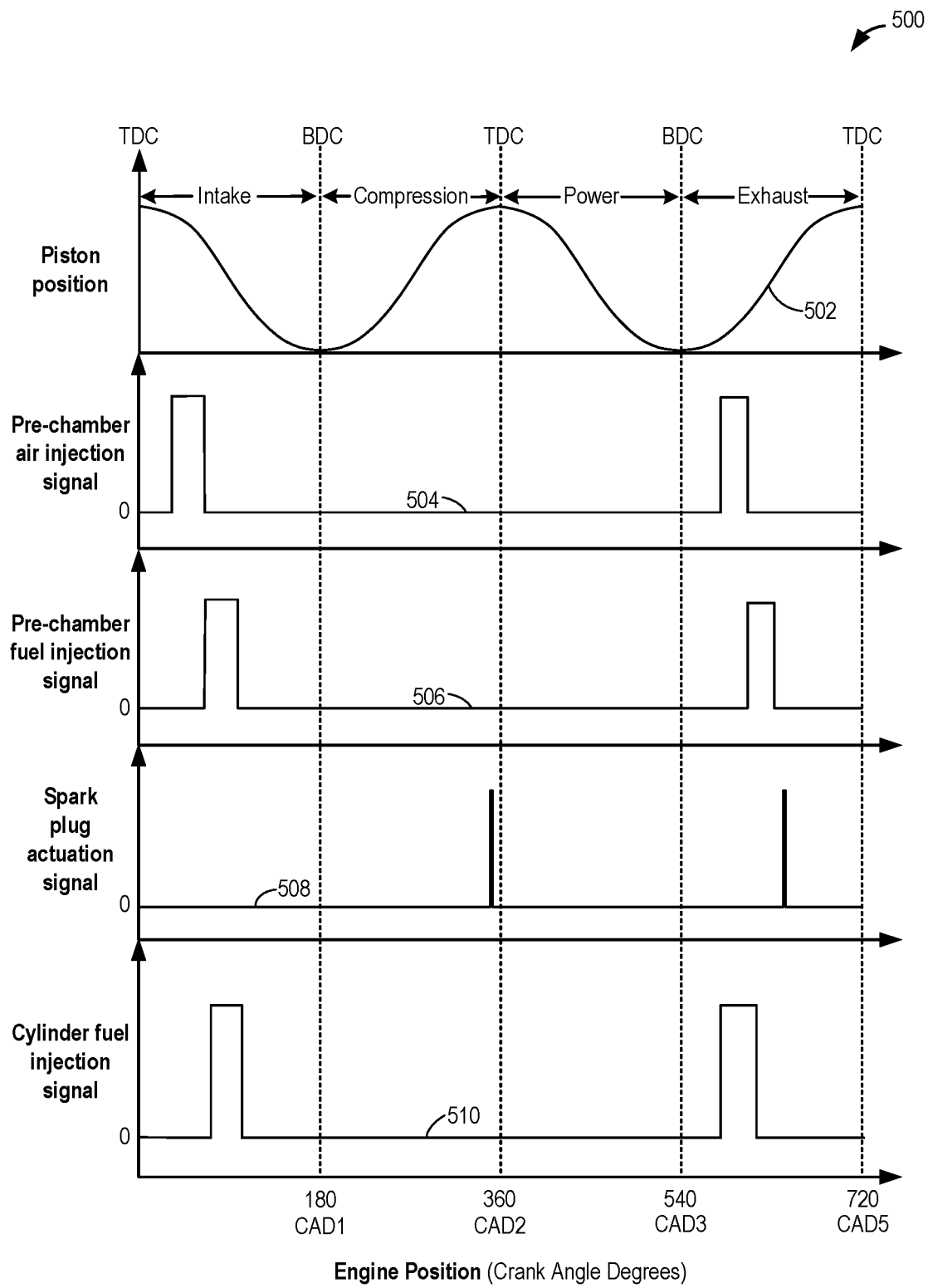
FIG. 5 shows example fuel injection, air injection, and spark timings during a combustion cycle of a cylinder operating in a catalyst heating mode.
Figure 6:
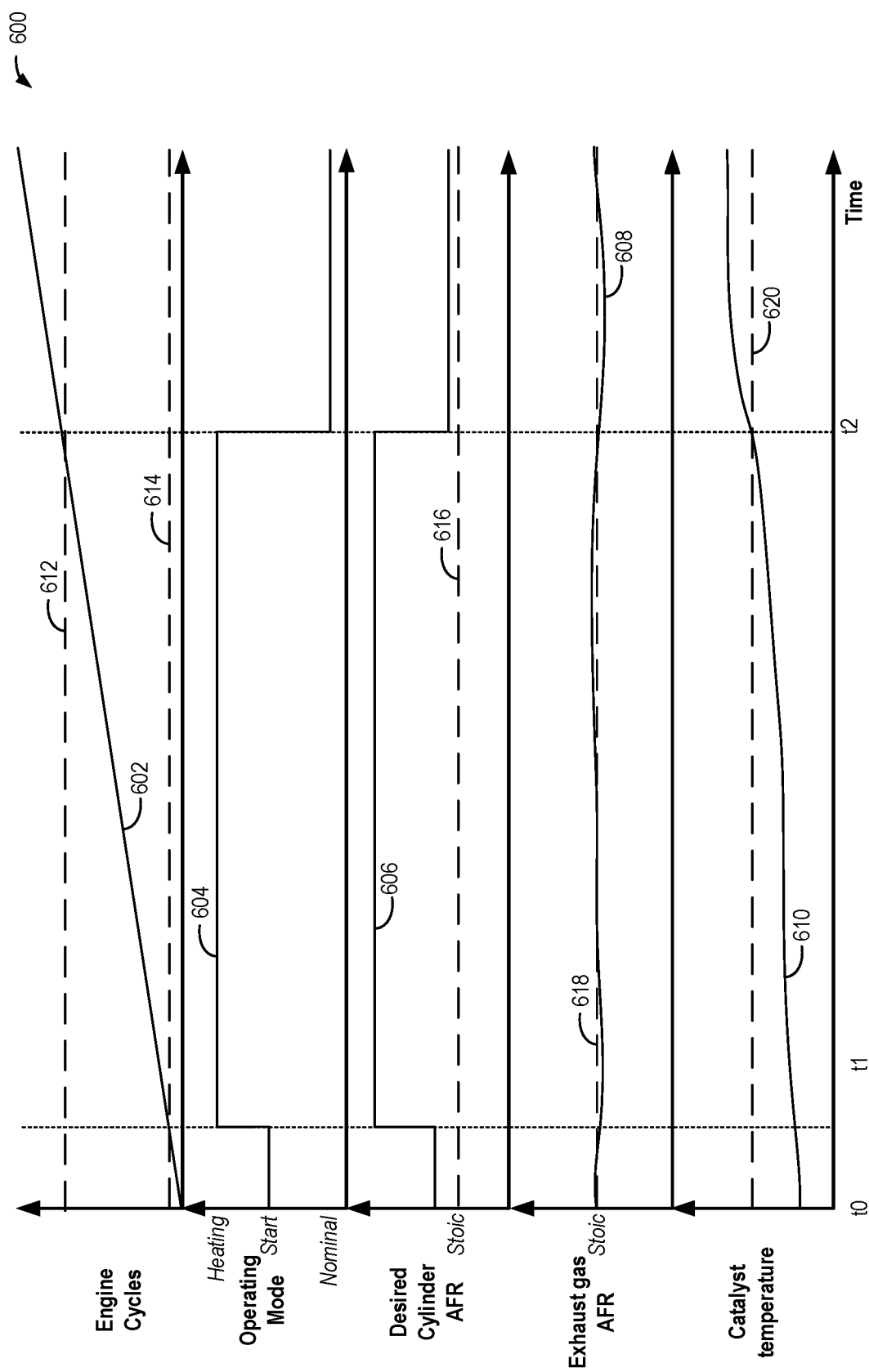
FIG. 6 shows a prophetic example timeline of adjustments to engine operation for increasing catalyst temperature in a pre-chamber ignition engine system.

The following description relates to systems and methods for increasing catalyst temperature during cold start for an internal combustion engine with pre-chamber ignition. The cylinder may have a cylinder configuration including an active pre-chamber that includes a fuel injector, a spark plug, and an air injector, such as shown in FIG. 1. Further, the pre-chamber may be operated to provide an ignition source to the cylinder, according to the method of FIG. 2. The cylinder, including the pre-chamber, may be operated in a catalyst heating mode according to the method of FIG. 3 in order to raise catalyst temperatures above a minimum threshold temperature for catalyst operation. FIGS. 4A-4B show schematic depictions of compositions of pre-chamber gases and cylinder gases during cylinder operation. FIG. 5 shows an example timing diagram for operating a cylinder and a pre-chamber to provide ignition and to provide catalyst heating, while FIG. 6 shows an example timeline of a relationship between crankshaft revolutions, cylinder air-fuel ratio (AFR), pre-chamber AFR, exhaust gas AFR, and catalyst temperature during cylinder operating in the catalyst heating mode.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 may have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, each cylinder 130 of engine 10 includes a pre-chamber 138 for initiating combustion. Pre-chamber 138 is defined by pre-chamber walls 139 and includes a spark plug 92, an air injector 94, and a pre-chamber fuel injector 96. Air injector 94 may be configured to inject air and/or oxygen into the pre-chamber. In some examples, air injector 94 is an electromagnetic (e.g., solenoid) injector. One or more of ambient air, oxygen, and another combustible gas may be delivered to air injector 94 by a pre-chamber air source 190. Note that in relation to pre-chamber air source 190, the term "air" may refer herein to ambient air, oxygen (e.g., $O_2$), hydrogen (e.g., $H_2$), or a mixture of such gases. In some examples, the pre-chamber air source 190 supplies air injector 94 with ambient air from an air intake passage of the engine. In other examples, pre-chamber air source 190 supplies air injector 94 with onboard-generated $O_2$, which may be stored in a pressurized tank. Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air-fuel ratio (AFR) that may differ from an AFR in cylinder 130.

Further, the pre-chamber walls 139 may include a plurality of openings, such as an opening 142 shown in FIG. 1. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When spark plug 92 provides the ignition spark to pre-chamber 138, the air-fuel mixture within the pre-chamber may combust, the increased pressure of combustion sending jets of flame into cylinder 130 via the plurality of openings in the pre-chamber walls 139, including opening 142. The plurality of openings may be arranged such that the jets of flame are evenly distributed in cylinder 130. The jets of flame may ignite the air-fuel mixture in cylinder 130, causing combustion.

After combustion, a mixture of exhaust gases from both pre-chamber 138 and cylinder 130 may be exhausted from cylinder 130 to exhaust manifold 48 via opening of exhaust valve 8. An exhaust gas sensor 128 is shown coupled to exhaust manifold 48 upstream of an emission control device 178, coupled within an exhaust passage 135. Exhaust gas sensor 128 may be selected from among various suitable sensors for providing an indication of an exhaust gas AFR, such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, examples of which is described with respect to FIGS. 2 and 3.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 2:
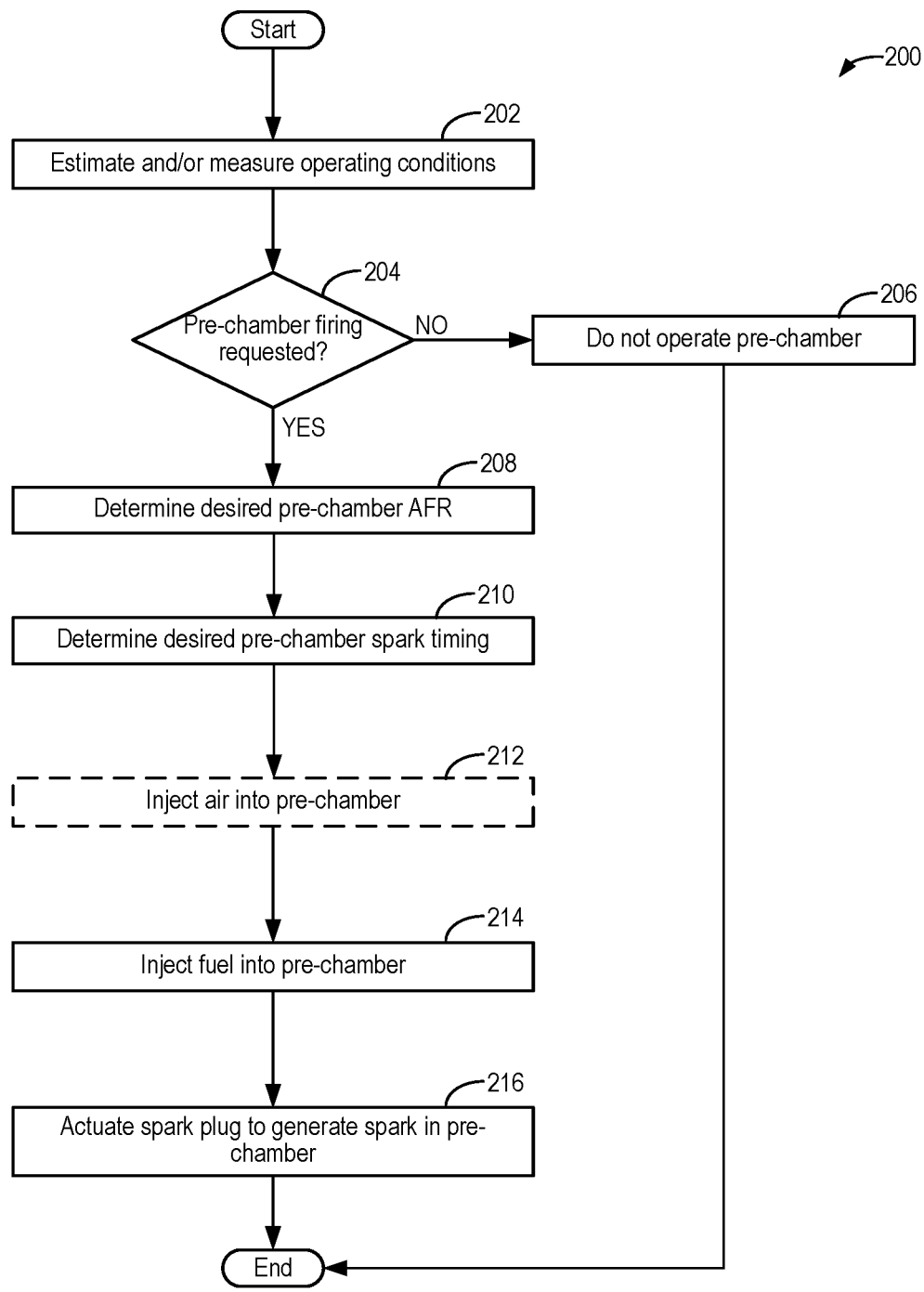
FIG. 2 depicts an example method for operating a pre-chamber of a cylinder.

Next, FIG. 2 shows an example method for operating a pre-chamber of an engine to combust an air-fuel mixture within the pre-chamber. As one example, operating the pre-chamber provides an ignition source for a cylinder of the engine. As another example, operating the pre-chamber increases an exhaust gas temperature. Method 200 will be described with respect to engine 10 and the cylinder configuration shown in FIG. 1, although method 200 may be applied in other systems that include active pre-chamber ignition. Further, method 200 will be described for one pre-chamber and cylinder pair, although it may be understood that method 200 may be simultaneously and/or sequentially executed for every cylinder of the engine. Instructions for carrying out method 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ actuators of the pre-chamber ignition system, including a pre-chamber fuel injector (e.g., pre-chamber fuel injector 96 of FIG. 1), a pre-chamber spark plug (e.g., pre-chamber spark plug 92 of FIG. 1), and a pre-chamber air injector (e.g., pre-chamber air injector 94 shown in FIG. 1) to adjust engine operation according to the methods described below.

At 202, method 200 includes estimating and/or measuring operating conditions. The operating conditions may include, for example, vehicle speed, engine speed, engine load, an engine temperature, an exhaust gas AFR, an accelerator pedal position, a brake pedal position, and a position of a throttle (e.g., throttle position). The operating conditions may be measured by one or more sensors communicatively coupled to the controller or may be inferred based on available data. For example, the accelerator pedal position may be measured by an acceleration position sensor, such as acceleration pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the AFR may be determined based on an oxygen level detected by an exhaust gas oxygen sensor, such as exhaust gas sensor 128 of FIG. 1. Similarly, the throttle position may be measured using a throttle position sensor coupled to the throttle.

At 204, method 200 includes determining whether a firing event is requested in the pre-chamber. In some examples, the pre-chamber firing event may be requested during nominal engine operation to provide an ignition source for the cylinder during each combustion cycle. A combustion cycle (e.g., a cylinder cycle) may refer to a four stroke movement of a piston of the cylinder, the four strokes including an intake stroke, a compression stroke, a power stroke, and an exhaust stroke. When the pre-chamber firing event is requested to provide an ignition source for the cylinder during a combustion cycle, the firing event may occur during the end of a compression stroke. In another example, the pre-chamber firing event may be requested during an exhaust stroke of a combustion cycle to increase a temperature of the pre-chamber (e.g., while operating in a pre-chamber heating mode described below with respect to FIG. 3).

If the pre-chamber firing event is not requested at 204, method 200 proceeds to 206, and includes not operating the pre-chamber. In some examples, the pre-chamber firing event may not be requested while engine combustion is discontinued. For example, engine combustion may be discontinued while the engine is shut down or during a fuel-cut condition, such as when cylinder fueling is shut off while the vehicle speed decreases. In another example, the pre-chamber firing event may not be requested when the pre-chamber firing event has already been performed during the combustion cycle. Not operating the pre-chamber may include not injecting fuel and air into the pre-chamber so that there is no air-fuel mixture for combustion within the pre-chamber. Without an air-fuel mixture to combust, not operating the pre-chamber may further include not activating the spark plug in the pre-chamber. Further, because combustion is not performed in the pre-chamber, not operating the pre-chamber may further include not providing an ignition source to the cylinder. However, in other examples, an alternative ignition source may be provided to the cylinder (e.g., via a cylinder spark plug that is independent from the pre-chamber spark plug or via compression ignition). In one example, the controller may adjust the pulse-widths of actuation signals to the fuel injector and the air injector such that no air-fuel mixture is injected into the pre-chamber. For example, no actuation signal may be sent to each of the fuel injector and the air injector. Further, the controller may adjust a control signal to the ignition system of the engine such that the spark plug in the pre-chamber is not activated.

If a pre-chamber firing event is requested at 204, method 200 proceeds to 208 and includes determining a desired pre-chamber AFR (e.g., a ratio of an amount of air injected to an amount of fuel injected into the pre-chamber). The desired AFR of the pre-chamber may be determined by the controller based on the AFR of the cylinder, such that combustion of an air-fuel mixture in the pre-chamber ignites an air-fuel mixture in the cylinder while minimizing emissions, as an example. For example, the controller may input the AFR of the cylinder and the current engine operating conditions, such as engine speed, exhaust gas temperature, and engine load, into one or more look-up tables, function, and maps, which may output the desired pre-chamber AFR to achieve combustion. As an example, the desired AFR of the pre-chamber may be stoichiometry. As another example, the desired AFR of the pre-chamber may be rich relative to stoichiometry during an engine cold start condition, which may increase combustion stability in the cold start condition, for example. As still another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometric combustion with the evaporated fuel. As yet another example, the desired AFR of the pre-chamber may be adjusted from stoichiometry when an operating AFR of the cylinder is adjusted from stoichiometry such that when the combustion gases from the cylinder and the pre-chamber are combined, the combined gases have an AFR approximately equal to stoichiometry (e.g., within 5% of stoichiometry). As a further example, the controller may determine the desired AFR of the pre-chamber based on based on a request to operate in a catalyst heating mode, as elaborated in FIG. 3.

At 210, method 200 includes determining a desired pre-chamber spark timing for the pre-chamber firing event. Determining the desired pre-chamber spark timing may include determining when to ignite the air-fuel mixture in the pre-chamber relative to a position of a piston of the cylinder. Although a cylinder spark plug firing induces combustion in a cylinder of a traditional spark-ignition engine, in an engine with pre-chamber ignition, combustion in the pre-chamber induces combustion in the cylinder. Thus, just as cylinder spark timing in the traditional spark-ignition engine may be adjusted relative to the spark timing for maximum brake torque (MBT) based on engine operating conditions, the timing of the pre-chamber firing event may be shifted relative to MBT based on engine operating conditions in order to achieve a desired cylinder ignition timing. For example, the pre-chamber spark timing may be retarded relative to MBT timing to increase an exhaust gas temperature, while the pre-chamber spark timing may be advanced closer to MBT timing to increase a torque output of the cylinder. As another example, if the engine is borderline limited and is unable to operate at MBT timing, engine knock control may advance or retard the pre-chamber spark timing to operate the engine at the borderline limit. In one example, the controller may input one or more engine operating conditions (e.g., engine speed, engine load, the exhaust gas temperature, a borderline knock limit, and cylinder AFR) into one or more look-up tables, functions, or maps to determine the desired timing for the pre-chamber firing event. In another example, the controller may make a logical determination (e.g., regarding the pre-chamber spark timing) based on logic rules that are a function of the one or more engine operating conditions. In still another example, the controller may determine the desired timing for the pre-chamber firing event based on instructions for operating in the pre-chamber heating mode, as will be elaborated below with respect to FIG. 3.

At 212, method 200 optionally includes injecting air into the pre-chamber. In some examples, the air injected may be ambient air from an intake manifold of the engine, while in other examples, the pre-chamber air injector may provide onboard-generated $O_2$ or another combustible gas such as $H_2$. The controller may adjust an amount of air injected into the pre-chamber based on the desired AFR of the pre-chamber, as determined at 208, and the position of the piston in the cylinder. For example, the controller may input the engine operating conditions, including the piston position and the desired AFR of the pre-chamber, into a look-up table, algorithm, or map, which may output a desired air injection amount. As an example, the air injection event may not only provide air for combustion, but may also purge residual gases from a previous pre-chamber firing event from the pre-chamber. In another example, the air injection amount may be held substantially constant while the fuel injection amount is varied to compensate for changes in the desired AFR. For example, an amount of air injected may be approximately equal to a volume in the pre-chamber.

After determining the amount of air to be injected, the controller may inject the desired air amount by adjusting the pulse-width of an actuation signal sent to the pre-chamber air injector. Further, an injection pressure may be above a peak pressure in the cylinder. Because of this, some of the air injected may flow into the cylinder (e.g., due to the pressure in the cylinder being lower than the pressure in the pre-chamber). An amount of air injected to the pre-chamber that flows into the cylinder may be determined based on a pressure difference between the air injector pressure and the pressure in the cylinder and a size of opening(s) in the pre-chamber walls. This value may be used in adjusting cylinder fuel control, for example. However, in other examples, method 200 may not include injecting air into the pre-chamber at 212. For example, the controller may determine that no additional air injection is required to achieve the desired AFR of the pre-chamber. In another example, a pre-chamber ignition system may not include a pre-chamber fuel injector, and may rely on passive air induction to achieve the desired pre-chamber AFR.

At 214, method 200 includes injecting fuel into the pre-chamber. The controller may adjust an amount of fuel injected into the pre-chamber based on the desired AFR of the pre-chamber, as determined at 208, and the amount of air injected at 212. For example, the controller may input the desired pre-chamber AFR into one or more look-up tables, functions, and maps, which may output a desired fuel amount to inject that will achieve the desired AFR in the pre-chamber. In one example, the controller may inject the desired fuel amount by adjusting the pulse-width of an actuation signal sent to the pre-chamber fuel injector, such as FPW2 shown in FIG. 1. The injected fuel may mix with the injected air (e.g., injected at 212) to form an air-fuel mixture.

At 216, method 200 includes actuating the pre-chamber spark plug to generate a spark in the pre-chamber. The controller may generate a control signal (e.g., signal SA) that is sent an ignition system (e.g., ignition system 88 of FIG. 1) to actuate the pre-chamber spark plug at the pre-chamber spark timing determined at 210. Generating the spark in the pre-chamber may cause the air-fuel mixture in the pre-chamber to combust, sending jets of hot gas and flame into the cylinder via a plurality of holes in the pre-chamber walls. When the cylinder also includes a combustible air-fuel mixture, the jets of hot gas and flame ignite the air-fuel mixture in the cylinder. After 216, method 200 may end.

In this way, the pre-chamber of a cylinder may be operated to ignite a first air-fuel mixture within the pre-chamber, which may further ignite a second air-fuel mixture in the cylinder. In some examples, method 200 may run continuously during nominal engine operation in order to continuously provide a cylinder ignition source when indicated. An engine with active pre-chamber ignition may produce fewer emissions relative to an engine without pre-chamber ignition. For example, jets of flame and hot gas from the pre-chamber may cause the second air-fuel mixture to combust more fully and with a lower peak combustion temperature than a spark plug, which may decrease NOx emissions.

However, as in traditional spark ignition engines, emissions from a pre-chamber ignition engine may increase during cold start conditions. Directly after a cold engine start, a catalyst in an exhaust system of the engine may operate below a threshold temperature for efficient operation, for example. Inefficient catalyst operation may drastically increase vehicle emissions during a cold start. For example, the catalyst may fail to remove $NO_x$ emissions during cold start engine operation. In some examples, emissions during the first minute of engine operation may account for up to 80% of engine emissions. Traditional spark ignition engines may raise the catalyst temperature via enleaned operation (e.g., AFR>1), which may increase a temperature of exhaust gas flowing to the catalyst. However, traditional spark ignition engines may experience undesirable noise, vibration, and handling issues during highly enleaned operation, such as when operating lean during a cold start. The inventors herein have advantageously recognized the comparative advantages of active pre-chamber ignition systems during cold start conditions, and have developed a method for operating a pre-chamber in a catalyst heating mode during cold start conditions, which may decrease an amount of time for a catalyst to reach a threshold temperature for efficient operation. Further, a pre-chamber may be operated in the catalyst heating mode in other conditions requiring rapid catalyst heating. Thus, operating in the catalyst heating mode according to the following method may improve overall catalyst efficiency.

Figure 3:
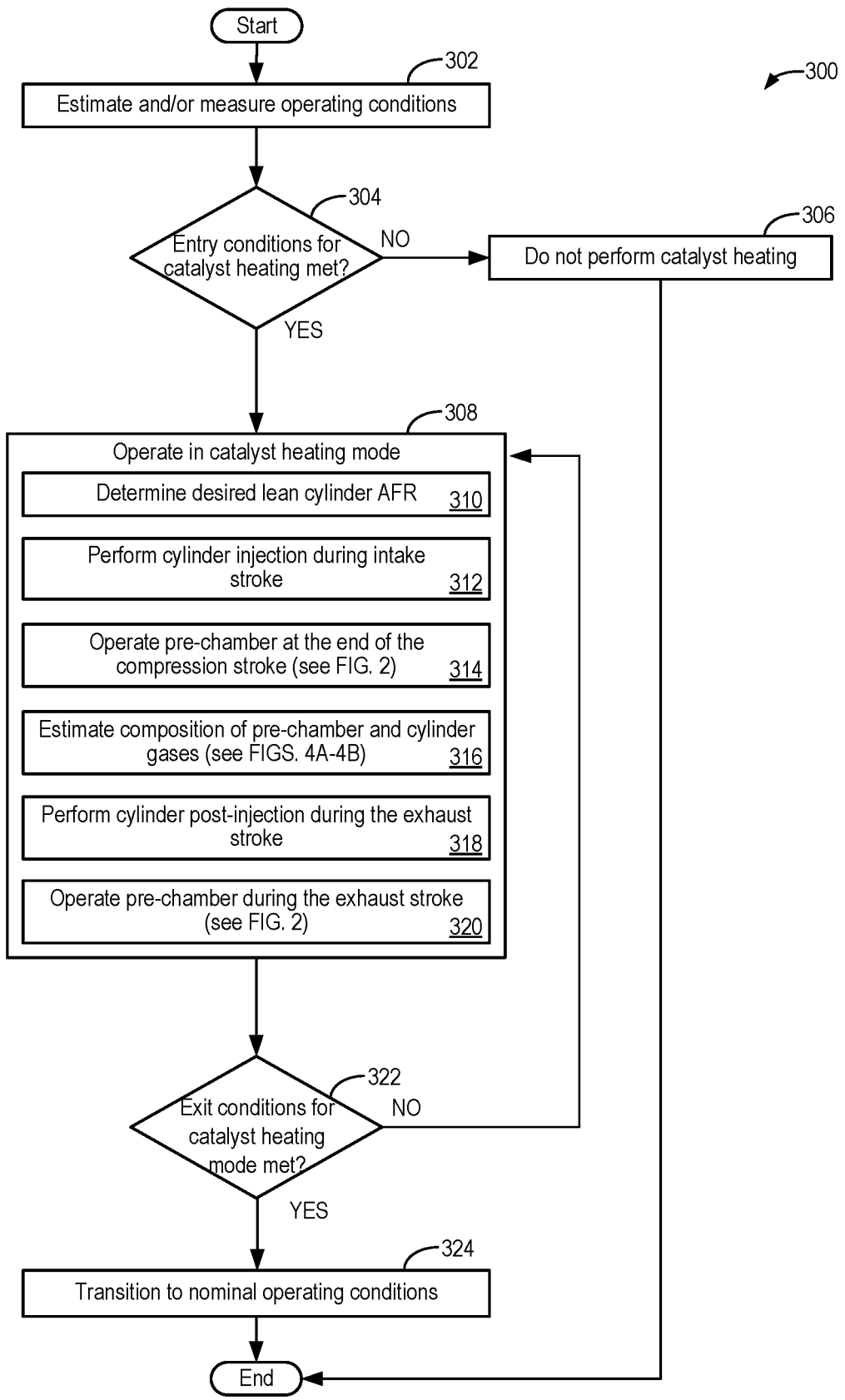
FIG. 3 depicts an example method for catalyst heating in a pre-chamber ignition engine system of a vehicle.

FIG. 3 shows an example method 300 for operating an active pre-chamber ignition system in a catalyst heating mode. As illustrated in FIG. 1, the cylinder may include a cylinder fuel injector (e.g., cylinder fuel injector 66), which may inject fuel into the cylinder, and a pre-chamber located in a clearance volume of the cylinder. Further, the pre-chamber may include a pre-chamber fuel injector (e.g., fuel injector 96 of FIG. 1), an air injector (e.g., air injector 94 of FIG. 1), and a spark plug (e.g., spark plug 92 of FIG. 1). As such, method 300 will be described with respect to the cylinder configuration shown in FIG. 1, although method 300 may be applied in other systems that include pre-chamber ignition. Instructions for carrying out method 300 may be executed by a controller, such as controller 12 of FIG. 1, based on instructions stored on a memory of the controller and in conjunction with signal received from sensors of the engine system, such as the sensors described above with reference to FIG. 1. The controller may employ engine actuators of the engine system to adjust cylinder fueling according to the method described below. Method 300 will be described with respect to a single cylinder including a pre-chamber, although method 300 may be performed simultaneously for a plurality of cylinders in a multi-cylinder engine with pre-chamber ignition.

At 302, method 300 includes estimating and/or measuring operating conditions. The operating conditions may include, for example, vehicle speed, engine speed, engine load, a catalyst temperature, an exhaust gas AFR, throttle position, a number of engine cycles since engine start, and an amount of time elapsed since engine start. The operating conditions may be measured by one or more sensors communicatively coupled to the controller or may be inferred based on available data. For example, the exhaust gas AFR may be determined based on a measurement from an exhaust gas oxygen sensor, such as exhaust gas oxygen sensor 128 of FIG. 1. As another example, the catalyst temperature may be determined based on a measurement from an exhaust gas temperature sensor, such as exhaust gas temperature (EGT) sensor 158 of FIG. 1. Further, the number of engine cycles since engine start may be determined based on a profile ignition pickup signal (PIP) from a Hall effect sensor, such as Hall effect sensor 120 of FIG. 1, for example.

At 304, method 300 includes determining whether the entry conditions for catalyst heating are met. In some examples, the conditions for entering the catalyst heating mode (e.g., entry conditions) may include exceeding an engine on duration and/or a number of engine cycles since an engine start. As an example, the first threshold engine on duration may be a pre-determined, non-zero number stored in controller memory that corresponds to a calibrated engine on duration after which catalyst heating is requested. As another example, the first threshold number of engine cycles may be a pre-determined, non-zero number stored in controller memory that corresponds to a calibrated number of engine cycles after the engine start before catalyst heating is requested. In some examples, the controller may adjust the first threshold engine on duration and/or the first threshold number of engine cycles by inputting the engine operating conditions (e.g., exhaust gas temperature, engine load, engine speed, exhaust gas AFR) into one or more look-up tables, maps, or functions, which may output the adjusted threshold number.

Further, the entry conditions for the catalyst heating mode may additionally or alternatively include a catalyst temperature below a second threshold catalyst temperature. The second threshold catalyst temperature may be a pre-determined, non-zero number stored in controller memory that corresponds to a calibrated catalyst temperature below which catalyst heating is recommended. For example, the second threshold catalyst temperature may be a temperature at which catalyst does not remove a sufficient percentage of exhaust components such as $NO_x$, $CO_2$, hydrocarbons, and the like. In some examples, the controller may adjust the second threshold catalyst temperature by inputting the engine operating conditions (e.g., exhaust gas temperature, engine load, engine speed, exhaust gas AFR) into one or more look-up tables, maps, or functions, which may output the adjusted second threshold catalyst temperature. In some examples, all of the entry conditions may be confirmed for the conditions for entering the catalyst heating mode to be considered met. For example, the entry conditions may not be met if the catalyst temperature is below the second threshold catalyst temperature, but the first threshold the engine start duration is not complete. As another example, the entry conditions may not be met if the first threshold the engine start duration is complete, but the catalyst temperature is not below the second threshold catalyst temperature. As a further example, the entry conditions may not be met if the catalyst temperature exceeds the first threshold catalyst temperature. For example, if an engine has recently been shut off before the most recent engine start, the catalyst temperature may exceed the first threshold catalyst temperature, and catalyst heating may not be requested. Any or all of the entry conditions may be confirmed for the conditions for entering the catalyst heating mode to be considered met.

In other examples, the engine may be calibrated to begin operating in the catalyst heating mode immediately after engine start, and thus in some examples the entry conditions may not include the threshold numbers of engine cycles after engine start or the second catalyst threshold temperature. Instead, in such an example, the entry conditions for entering the catalyst heating mode may include whether a key-on event has occurred since last operating in the catalyst heating mode.

If the entry conditions are not met, method 300 proceeds to 306 and includes not operating in the catalyst heating mode. In some examples, not operating in the catalyst heating mode may include not adjusting engine operation for the purpose of catalyst heating. For example, an air-fuel mixture may not be combusted in the pre-chamber during an exhaust stroke for the purpose of facilitating afterburning of excess air and residual gas in the cylinder, thus increasing a temperature of the exhaust gas. As another example, engine operation may continue to be adjusted according to a driver demand, for example. In still other examples, not operating in the catalyst heating mode may include adjusting engine operation to operate in another mode, for example, according to a request for a diagnostic procedure. Following 306, method 300 ends. As one example, method 300 may be repeated as engine operating conditions change so that the controller may re-evaluate whether the catalyst heating mode entry conditions are met.

If the entry conditions are instead met, method 300 proceeds to 308 and includes operating in the catalyst heating mode. Operating in the catalyst heating mode includes operating the cylinder with a lean AFR during a compression stroke, performing a cylinder post-injection, and performing an additional pre-chamber combustion during an exhaust stroke. The pre-chamber may be operated during the compression stroke and the exhaust stroke according to the method of FIG. 2, such that an air-fuel mixture is injected in the pre-chamber and ignited by the spark plug. The compression stroke may occur as cylinder gases are compressed before a combustion reaction, and the exhaust stroke may occur after energy from the combustion reaction in the cylinder drives a piston (e.g., piston 136 of FIG. 1) downwards during the power stroke.

Operating in the catalyst heating mode includes determining a desired cylinder AFR for the catalyst heating mode, as indicated at 310. The desired AFR of the cylinder may be determined by the controller in order to increase the exhaust gas temperature while minimizing emissions, as an example. For example, the controller may input the current engine operating conditions, such as engine speed, exhaust gas temperature, and engine load, into one or more look-up tables, function, and maps, which may output the desired cylinder AFR to achieve combustion. As an example, the desired AFR of the cylinder during the catalyst heating mode may be lean in order to increase a temperature of cylinder exhaust gas. In some examples, the desired AFR of the pre-chamber may be further adjusted from stoichiometry such that when the combustion gases from the cylinder and the pre-chamber are combined, the combined gases have an AFR approximately equal to stoichiometry.

Operating in the catalyst heating mode further includes performing cylinder injection during the intake stroke, as indicated at 312. For example, fuel is injected into the cylinder by actuating a cylinder fuel injector, such as cylinder fuel injector 66 of FIG. 1, during the intake stroke. An amount of fuel injected into the cylinder during the intake stroke may be determined based on the desired AFR of the cylinder and an estimated air flow into the cylinder during the intake stroke. For example, the controller may input the desired pre-chamber AFR, throttle position, and engine speed into one or more look-up tables, functions, and maps, which may output a desired fuel amount to inject that will achieve the desired AFR in the pre-chamber. In one example, the controller may inject the desired fuel amount by adjusting the pulse-width of an actuation signal sent to the pre-chamber fuel injector, such as FPW1 shown in FIG. 1. The injected fuel may mix with the inducted air during the intake stroke to form an air-fuel mixture. Further, by injecting fuel during the intake stroke, the air-fuel mixture in the cylinder may have better mixing, relative to systems with compression ignition, which may improve combustion stability.

Operating in the catalyst heating mode further includes operating the pre-chamber during the compression stroke, as indicated at 314. In particular, the pre-chamber may be operated according to method 200 of FIG. 2, such that an air-fuel mixture is injected into the pre-chamber and ignited by the spark plug. For example, the controller may determine that a pre-chamber firing is requested, may determine a desired pre-chamber AFR based on the cylinder AFR, and may determine a desired pre-chamber spark timing. In particular, the controller may adjust the desired pre-chamber AFR to minimize emissions while operating in the catalyst heating mode. Operating the pre-chamber during the compression stroke may further include optionally injecting air into the pre-chamber, injecting fuel into the pre-chamber, and actuating the spark plug in order to generate a spark in the pre-chamber, which may combust the air-fuel mixture in the pre-chamber. Combusting the air-fuel mixture in the pre-chamber may force jets of hot air and flame to exit the pre-chamber via one or more orifices in pre-chamber walls (e.g., opening 142 in pre-chamber wall 139 of FIG. 1), thus combusting the cylinder air-fuel mixture and generating power.

Operating in the catalyst heating mode further includes estimating a composition of a pre-chamber gas and a composition of a cylinder gas after combustion, where the composition of a gas after combustion is defined as a ratio of excess air to residual gas, as indicated at 316. Specifically, after combustion, gas remaining in the pre-chamber may be a mixture of excess air and residual exhaust gas, and gas remaining in the cylinder may be a mixture of air and residual exhaust gas. Thus, the composition of the pre-chamber gas may be a first amount of residual gas and a first amount of excess air, and the composition of the cylinder gas may be a second amount of residual gas and a second amount of excess air. Estimating the composition of the pre-chamber gas and the composition of the cylinder gas may be better explained in reference to FIGS. 4A-4B, which show schematic representations of the composition of pre-chamber and cylinder gases before and after combustion.

Turning now to FIG. 4A, a diagram 400 of the composition of pre-chamber and cylinder gases before combustion is shown. Diagram 400 includes a schematic representation of pre-chamber 138 and cylinder 130. In particular, FIG. 4A shows the composition of pre-chamber gases and cylinder gases after all pre-chamber and cylinder injection events are complete, the exhaust valve is closed, and the intake valve is closed. Just before combustion, pre-chamber 138 includes a first air-fuel mixture 402, illustrated by dark shading, which may be rich relative to stoichiometry. Further, cylinder 130 includes a second air-fuel mixture 404, illustrated with light shading, which may be lean relative to stoichiometry. In some examples, a combined AFR of the cylinder gas and the pre-chamber gas may be calibrated to approximate stoichiometric operation. As an example, the AFR of the pre-chamber may be determined based on the AFR of the cylinder such that a total amount of air in both the pre-chamber and the cylinder is equal to a total amount of fuel in both the pre-chamber and the cylinder. However, in some examples the combined AFR may deviate from stoichiometry in order to improve engine performance.

Next, FIG. 4B shows a diagram 410 of pre-chamber and cylinder gases after combustion. Like diagram 400 of FIG. 4A, diagram 410 includes a schematic representation of pre-chamber 139 and cylinder 130. However, after the first air-fuel mixture in the pre-chamber combusts, and ignites the second air-fuel mixture in the cylinder, the composition of pre-chamber gas and cylinder gas changes, as exothermic combustion reactions convert the pre-chamber air-fuel mixture and the cylinder air-fuel mixture into heat energy. After combustion, excess air and residual gas from combustion may remain in the pre-chamber and the cylinder. In particular, FIG. 4B shows the composition of pre-chamber gases and cylinder gases after the combustion reactions are complete, and before the exhaust valve opens. As illustrated in FIG. 4B, pre-chamber 138 includes first amount of excess air 412 and a first amount of residual gas 416. Further, cylinder 130 includes a second amount of excess air 414 and a second amount of residual gas 418.

Thus, at 316, estimating the composition of pre-chamber gas and the composition of cylinder gas after combustion may include estimating the amounts shown in FIG. 4B, for example. In some examples, the ratio of excess air to residual gas in the pre-chamber (e.g., the ratio of the first amount of excess air 412 to the first amount of residual gas 416) may be lower than the ratio of excess air to residual gas in the cylinder (e.g., the ratio of the second amount of excess air 414 to the second amount of residual gas 418), while in other examples this relationship may be reversed. In yet other examples, the ratio of excess air to residual gas in the pre-chamber may be equal to the ratio of excess air to residual gas in the cylinder. As an example, the controller may estimate the composition of pre-chamber gas and cylinder gas after combustion by inputting the pre-chamber AFR, the cylinder AFR, the exhaust gas temperature, the exhaust gas AFR, and the ignition timing into one or more look-up tables, maps, or functions. Additionally or alternatively, the controller may make a logical determination (e.g., regarding the pre-chamber gas composition and/or the cylinder gas composition) based on logic rules that are a function of one or more engine operating conditions. In one example, the controller may estimate the amount of excess air in the pre-chamber 412 based on the amount of air injected to the pre-chamber before combustion. As another example, the controller may estimate the amount of excess air in the cylinder 414 based on an amount of air inducted to the cylinder during the intake stroke.

Operating in the catalyst heating mode includes performing a cylinder post-injection during the exhaust stroke, as indicated at 318. Performing the cylinder post-injection may include determining an amount of fuel to inject into the cylinder during the exhaust stroke (e.g., an amount of post-injection fuel). The amount of post-injection fuel may be calibrated to maximize an amount of heat generated during an exhaust stroke reaction, and may be adjusted based on amounts of excess air and residual gas in the pre-chamber and the cylinder. For example, the controller may input the composition of pre-chamber gas and the composition of cylinder gas, as estimated at 314, into one or more look-up tables, maps, or functions, which may output an amount of post-injection fuel. Performing the cylinder post-injection may further include injecting the amount of post-injection fuel into the cylinder via the cylinder fuel injector. In one example, the controller may inject the desired fuel amount by adjusting the pulse-width of an actuation signal sent to the cylinder fuel injector, such as FPW1 shown in FIG. 1.

Operating in the catalyst heating mode includes operating the pre-chamber during the exhaust stroke, as indicated at 320. In particular, the pre-chamber may be operated according to method 200 of FIG. 2, such that an air-fuel mixture is injected into the pre-chamber and ignited by the spark plug. In particular, the controller may adjust the desired pre-chamber AFR to minimize emissions while operating in the catalyst heating mode. For example, the controller may determine that a pre-chamber firing is requested during the exhaust stroke, and may determine a desired pre-chamber AFR by inputting the amount of post-injection fuel, the composition of pre-chamber gases, and the composition of cylinder gases into one or more look-up tables, maps, or functions. Further, the controller may determine a desired pre-chamber spark timing. Operating the pre-chamber during the exhaust stroke may further include optionally injecting air into the pre-chamber, injecting fuel into the pre-chamber, and actuating the spark plug in order to generate a spark in the pre-chamber, which may combust the air-fuel mixture in the pre-chamber. Combusting the air-fuel mixture in the pre-chamber may force jets of hot air and flame to exit the pre-chamber via one or more orifices in pre-chamber walls (e.g., opening 142 in pre-chamber wall 139 of FIG. 1). However, due to the relatively low pressure in the cylinder during the exhaust stroke, relative to the compression stroke, pre-chamber combustion may not trigger combustion of an air-fuel mixture in the cylinder. Rather, the jets of flame and hot gas may burn excess air and post-injection fuel, which may generate heat in the exhaust flow.

At 322, method 300 includes determining whether exit conditions for the catalyst heating mode are met. In some examples, the conditions for exiting the catalyst heating mode (e.g., exit conditions) may include exceeding the engine on duration and/or a number of engine cycles since the engine start. As an example, the second threshold the engine start duration may be a pre-determined, non-zero number stored in controller memory that corresponds to a calibrated the engine start duration after which catalyst heating is no longer requested. As another example, the second threshold number of engine cycles may be a pre-determined, non-zero number stored in controller memory that corresponds to a calibrated number of engine cycles after the engine start after which catalyst heating is no longer requested. In some examples, the controller may adjust the second threshold the engine on duration and/or the second threshold number of engine cycles by inputting the engine operating conditions (e.g., exhaust gas temperature, engine load, engine speed, exhaust gas AFR) into one or more look-up tables, maps, or functions, which may output the adjusted threshold number.

Further, the exit conditions for the catalyst heating mode may additionally or alternatively include a catalyst temperature below a third threshold catalyst temperature. The third threshold catalyst temperature may be a pre-determined, non-zero number stored in controller memory that corresponds to a calibrated catalyst temperature above which catalyst heating is no longer recommended. For example, the third threshold catalyst temperature may be a temperature at which the catalyst removes a sufficient percentage of exhaust components such as $NO_x$, $CO_2$, hydrocarbons, and the like. In some examples, the controller may adjust the third threshold catalyst temperature by inputting the engine operating conditions (e.g., exhaust gas temperature, engine load, engine speed, exhaust gas AFR) into one or more look-up tables, maps, or functions, which may output the adjusted third threshold catalyst temperature. Any or all of the exit conditions may be confirmed for the conditions for exiting the catalyst heating mode to be considered met.

If the exit conditions for the catalyst heating mode are not met at 322, method 300 returns to 308 and continues to operate in the catalyst heating mode, which includes performing a cylinder post-injection and operating the pre-chamber during the exhaust stroke. Additional pre-chamber combustion events during the exhaust stroke may further increase the catalyst temperature, which may decrease an amount of vehicle emissions after cold-start.

If the exit conditions for the catalyst heating mode are met at 322, method 300 proceeds to 324 and includes transitioning to nominal operating conditions. For example, an air-fuel mixture may not be delivered to and combusted in the pre-chamber during the exhaust stroke. For example, the fuel injector may not inject fuel during the exhaust stroke, the air injector may not inject air during the exhaust stroke, and the spark plug may not actuate during the exhaust stroke. Further, the controller may not adjust the pulse-width of the signal to the cylinder fuel injector to command a cylinder post-injection in the exhaust stroke. Following 324, method 300 ends.

Turning now to FIG. 5, an exemplary timing chart 500 of a cylinder operating in a catalyst heating mode is shown. The cylinder may be cylinder 130 of engine 10 in FIG. 1, for example, and may include a pre-chamber ignition system (e.g., pre-chamber 138 of FIG. 1). Timing chart 500 shows one combustion cycle, wherein the combustion cycle (e.g., a cylinder cycle) refers to four strokes of an engine cycle within a cylinder. A piston position relative to top dead center (TDC), bottom dead center (BDC), and the four strokes of the combustion cycle (intake, compression, power, and exhaust) is shown in plot 502. Further, a pre-chamber fuel injection signal is shown in plot 504, a pre-chamber air injection signal is shown in plot 506, a spark plug actuation signal is shown in plot 508, and a cylinder fuel injection signal is shown in plot 510. For all of the above, the horizontal axis represents relative crank angle (e.g., in crank angle degrees), with the crank angle degrees (CAD) increasing from left to right, and 0 CAD corresponding to the start of the intake stroke. The vertical axis represents each labeled parameters. For plot 502, the vertical axis shows the piston position relative to TDC. For each of plots 504, 506, 508, and 510, an increase in a magnitude of the parameter above zero indicates actuation of the corresponding injector or spark plug. Further, the stroke of the combustion cycle is indicated at the top of timing chart 500, with the intake stroke corresponding to the interval from 0 CAD to 180 CAD, the compression stroke corresponding to the interval from 180 CAD to 360 CAD, the power stroke corresponding to the interval from 360 CAD to 540 CAD, and the exhaust stroke corresponding to the interval from 540 CAD to 720 CAD.

At the beginning of the intake stroke (e.g., around 0 CAD), air is introduced into the cylinder via the intake manifold and one or more intake ports, and the piston position (plot 502) decreases as the piston moves to the bottom of the cylinder, increasing the volume within the cylinder. Fuel is injected into the pre-chamber (plot 504) via a pre-chamber fuel injector (e.g., pre-chamber fuel injector 96 of FIG. 1), and air is injected into the pre-chamber (plot 506) via a pre-chamber air injector (e.g., air injector 94 of FIG. 1) to produce a first air-fuel mixture in the pre-chamber. Further, during the intake stroke, fuel is also introduced into the cylinder (plot 510) via a cylinder fuel injector (e.g., cylinder fuel injector 66 of FIG. 1), forming a second air-fuel mixture with the air inducted into the cylinder. At the end of the intake stroke (e.g., around 180 CAD), the piston position (plot 502) reaches its lowest value.

At the beginning of the compression stroke (e.g., around 180 CAD), the piston position (plot 502) increases as the piston begins to moves toward the cylinder head, compressing air within the cylinder. In a process herein referred to as ignition, the first air-fuel mixture in the pre-chamber is ignited via a spark generated by actuating a spark plug (plot 508) in the pre-chamber (e.g., spark plug 92 of FIG. 1), resulting in pre-chamber combustion. For example, the spark plug may be actuated shortly before TDC of the compression stroke, as shown in timing chart 500. As the first air-fuel mixture in the pre-chamber combusts, jets of flame and hot air flow from the pre-chamber to the cylinder via openings in the pre-chamber, and the jets of flame and hot air ignite the second air-fuel mixture in the cylinder. During the power stroke, piston position (plot 502) decreases as expanding gases in the cylinder push the piston back down to BDC. A crankshaft (e.g., crankshaft 140 shown in FIG. 1) converts this piston movement into a rotational torque of the rotary shaft.

At the beginning of the exhaust stroke (e.g., around 540 CAD), the exhaust valves are opened to release combustion exhaust to the corresponding exhaust passages, and the piston position (plot 502) increases. While operating in the catalyst heating mode, an additional combustion event occurs in the pre-chamber during the exhaust stroke to increase an exhaust gas temperature. In particular, pre-chamber fuel (plot 504) and pre-chamber air (plot 506) are both injected into the pre-chamber during the first half of the exhaust stroke (e.g., before 630 CAD). Further, cylinder post-injection fuel (plot 510) is injected into the cylinder during the first half of the exhaust stroke. After pre-chamber and cylinder injections are complete, the spark plug (plot 508) is actuated roughly half-way through the exhaust stroke (e.g., around 630 CAD). In other examples, pre-chamber fuel injection, pre-chamber air injection, cylinder post-injection, and spark plug actuation may occur at different piston positions. Actuating the spark plug combusts the air-fuel mixture in the pre-chamber, which facilitates burning of excess air and post-injection fuel in the cylinder. These exothermic reactions may send additional heat into the exhaust stream, increasing the exhaust gas temperature and accelerating catalyst heating, relative to systems not operating in a catalyst heating mode. Catalyst heating may occur over a plurality of engine cycles.

Turning now to FIG. 6, a prophetic example timeline 600 of an engine operating in a pre-chamber heating mode is shown. The engine may be engine 10 in FIG. 1, for example, and may include an exhaust gas temperature sensor (e.g., exhaust gas temperature sensor 158). Although some parameters are shown for a single cylinder in FIG. 6, it may be understood that the cylinder may be included in a multi-cylinder engine system. The cylinder may be cylinder 130 shown in FIG. 1, for example, and may include a pre-chamber as an ignition source (e.g., pre-chamber 138 of FIG. 1). A number of engine cycles after engine start (e.g., a counter by which a controller tracks a number of engine cycles elapsed since engine start) is shown in plot 602, an engine operating mode is shown in plot 604, a commanded cylinder AFR is shown in plot 606, an exhaust gas AFR is shown in plot 608, and a catalyst temperature is shown in plot 610. Further, a first threshold number of engine cycles is shown by dashed line 612, a second threshold number of engine cycles is shown by dashed line 614, a stoichiometric cylinder AFR is shown by dashed line 616, a stoichiometric exhaust gas AFR is shown by dashed line 618, and a threshold catalyst temperature is shown by dashed line 620. In FIG. 6, the first threshold number of engine cycles is lower than the second threshold number of engine cycles, and the first threshold catalyst temperature is lower than the second threshold catalyst temperature. For all of the above, the horizontal axis represents time, with time increasing along the horizontal axis from left to right. The vertical axis represents each labeled parameter. For each of plots 602, 606, 608, and 610, a magnitude of the parameter increases up the vertical axis. For plot 604, the vertical axis shows whether the engine is operating in a catalyst heating mode ("heating"), a starting mode ("start"), or a nominal operating mode ("nominal").

At time t0, the engine is turned on, and the amount of engine cycles after the engine start (plot 602) is zero, which is below the first threshold number of engine cycles. The first threshold number of engine cycles may be the number of engine cycles after the engine start after which catalyst heating is requested. Therefore, the engine is not operated in the catalyst heating mode (plot 604). In the example of timeline 600, the engine is operating in a starting mode, with a cylinder AFR (plot 606) slightly lean relative to stoichiometry (dashed line 614). In the example shown, the exhaust gas AFR (plot 608) is within 5% of stoichiometry at time t0, as a pre-chamber AFR may be determined to produce stoichiometric exhaust when combined with the cylinder exhaust. While operating in the starting mode, a pre-chamber combustion event occurs only during a compression stroke, as described above with respect to FIG. 2, such that jets of hot gas and flame ignite an air-fuel mixture in the cylinder to produce torque.

Just prior to time t1, the engine cycle counter (plot 602) exceeds the first threshold number of engine cycles (dashed line 614). Further, just before time t1, the catalyst temperature (plot 606) is below the threshold catalyst temperature (dashed line 620). The threshold catalyst temperature may be a temperature below which operating in the catalyst heating mode is indicated. For example, an exhaust system component (e.g., emission control device 178 of FIG. 1) may not efficiently remove NOx from exhaust gas while operating below the threshold catalyst temperature. Thus, in response to the number of engine cycles (plot 602) exceeding the first threshold number (dashed line 614) and the catalyst temperature (plot 610) being below the threshold catalyst temperature, entry conditions for operating in the catalyst heating mode are considered met, and the engine is transitioned into operating in catalyst heating mode (plot 604).

Between time t1 and time t2, the engine operates in the catalyst heating mode, as demonstrated by plot 604. While operating in the catalyst heating mode, an additional combustion event in the pre-chamber and post-injection in the cylinder are commanded during the exhaust stroke of the cylinder. The pre-chamber may be operated according to the timing chart of FIG. 5 such that two pre-chamber combustion events occur in each cylinder combustion cycle. Further, the additional combustion events in the pre-chamber generate additional heat in the exhaust system. As a result, the catalyst temperature (plot 610) increases between t1 and t2. Further, the exhaust gas AFR (plot 608) remains within 5% of stoichiometric exhaust gas AFR (dashed line 618) between time t1 and time t2.

Just before time t2, the number of engine cycles (plot 602) exceeds the second threshold number of engine cycles after the engine start (dashed line 612), which may be a non-zero threshold number of engine cycles after which the catalyst heating mode is determined to be complete. In other examples, the engine may transition out of the catalyst heating mode when the catalyst temperature exceeds a threshold temperature. Thus, at time t2, the engine is transitioned out of operating in the pre-chamber heating mode (plot 604). As a result, additional pre-chamber combustion events in the exhaust stroke are not requested, while pre-chamber combustion continues during the compression stroke. Further, at time t2, desired cylinder AFR decreases to a lower AFR slightly rich of stoichiometry (dashed line 618), while the exhaust gas AFR (plot 608) remains within 5% of stoichiometry (dashed line 618) and the catalyst temperature remains above the threshold catalyst temperature.

After time t2, the engine operates in a nominal operating mode, and the number of engine cycles (plot 602) increases linearly with time. Further, the exhaust gas AFR (plot 608) remains close to stoichiometry (dashed line 618) and the catalyst temperature (plot 610) remains level, as the pre-chamber is no longer undergoing additional combustion in the exhaust stroke. In some examples, other engine operating conditions may cause the catalyst temperature and/or the exhaust gas AFR to increase during the nominal operating mode. For example, a driver torque demand may increase the engine load, which may indirectly increase a catalyst temperature. As another example, a lean commanded AFR may increase an exhaust gas temperature and an exhaust gas AFR during the nominal operating mode.

In this way, a temperature of a catalyst in an engine with a pre-chamber ignition system may be increased by operating in a catalyst heating mode. For example, additional combustion events may occur in the pre-chamber, and may trigger an exothermic reaction with excess air and post-injection fuel in the cylinder. As a result, an exhaust gas temperature may be increased, which may increase a catalyst temperature. By increasing the temperature of the catalyst, the catalyst temperature may more quickly reach the threshold temperature for efficient operation after a cold start, decreasing vehicle emissions that may otherwise occur during a cold start condition.

The technical effect of performing an additional pre-chamber combustion during the exhaust stroke is that a catalyst temperature is increased, reducing vehicle emissions by increasing catalyst efficiency during operating conditions such as a cold start.

As an example, a method comprises, during a cold start condition, injecting an amount of post-injection fuel in a cylinder during an exhaust stroke of the cylinder, the amount based on an air-fuel ratio (AFR) of a first pre-chamber air-fuel mixture and an AFR of a first cylinder air-fuel mixture. In the preceding example, the method additionally or optionally further comprises combusting the first pre-chamber air-fuel mixture in a pre-chamber during a compression stroke of the cylinder to ignite the first cylinder air-fuel mixture; and combusting a second pre-chamber air-fuel mixture in the pre-chamber during the exhaust stroke of the cylinder. In one or both of the preceding examples, additionally or optionally, combusting an air-fuel mixture in the pre-chamber of the cylinder includes: delivering air for the air-fuel mixture via a pre-chamber air injector; delivering fuel for the air-fuel mixture via a pre-chamber fuel injector; and igniting the air-fuel mixture via a pre-chamber spark plug. In any or all of the preceding examples, additionally or optionally, injecting the amount of post-injection fuel in the cylinder during the exhaust stroke of the cylinder includes delivering fuel for a post injection via a cylinder fuel injector. In any or all of the preceding examples, additionally or optionally, an AFR of exhaust gas from each combustion cycle is substantially stoichiometric. In any or all of the preceding examples, additionally or optionally, the AFR of the first pre-chamber air-fuel mixture is rich relative to the AFR of the first cylinder air-fuel mixture. In any or all of the preceding examples, additionally or optionally, the cold start condition is indicated responsive to a duration after an engine start. In any or all of the preceding examples, additionally or optionally, the cold start condition is indicated responsive to a number of crankshaft revolutions after the engine start increasing above a threshold number of crankshaft revolutions after the engine start. In any or all of the preceding examples, additionally or optionally, the cold start condition is indicated responsive to a catalyst temperature decreasing below a threshold catalyst temperature.

As another example, a method comprises: responsive to an engine start, operating a cylinder with a first pre-chamber air-fuel ratio (AFR) and a first cylinder AFR during a compression stroke of the cylinder; and responsive to exceeding a threshold number of engine cycles after the engine start, operating the cylinder with a second pre-chamber AFR and a second cylinder AFR during the compression stroke of the cylinder, the second cylinder AFR based on the second pre-chamber AFR, the second pre-chamber AFR rich relative to the first pre-chamber AFR, and the second cylinder AFR lean relative to the first cylinder AFR. In the preceding example, additionally or optionally, the second pre-chamber AFR is rich relative to stoichiometry, and the second cylinder AFR is lean relative to stoichiometry. In one or both of the preceding examples, additionally or optionally, operating the cylinder with the second pre-chamber AFR and the second cylinder AFR during the compression stroke includes: producing a first air-fuel mixture in the pre-chamber by injecting a first amount of fuel in the pre-chamber and injecting a first amount of air in the pre-chamber during an intake stroke of the cylinder, the first amount of fuel and the first amount of air determined based on the second pre-chamber AFR; producing a second air-fuel mixture in the cylinder by injecting a second amount of fuel in the cylinder during the intake stroke of the cylinder, the second amount of fuel based in part on the second cylinder AFR; igniting the first air-fuel mixture in the pre-chamber via a spark plug to generate flames during the compression stroke of the cylinder; and igniting the second air-fuel mixture in the cylinder via the flames from the pre-chamber during the compression stroke of the cylinder. In any or all of the preceding examples, the method additionally or optionally further comprises: responsive to exceeding the threshold number of engine cycles after the engine start, injecting a third amount of fuel in the cylinder and operating the pre-chamber with a third pre-chamber AFR during the exhaust stroke of the cylinder, the third amount of fuel based on the second pre-chamber AFR, the second cylinder AFR, and the third pre-chamber AFR. In any or all of the preceding examples, additionally or optionally, operating the pre-chamber with the third pre-chamber AFR during the exhaust stroke of the cylinder includes: determining the third pre-chamber AFR based in part on the second pre-chamber AFR; producing a third air-fuel mixture in the pre-chamber by injecting a fourth amount of fuel in the pre-chamber and injecting a second amount of air in the pre-chamber during the exhaust stroke of the cylinder, the fourth amount of fuel and the second amount of air determined based on the third pre-chamber AFR; and injecting a second amount of air in the pre-chamber during an exhaust stroke of the cylinder, the second amount of air determined based on the second pre-chamber AFR and the second cylinder AFR. In any or all of the preceding examples, additionally or optionally, an AFR of exhaust gas from operating the cylinder with the second pre-chamber AFR and the second cylinder AFR is stoichiometric.

As another example, a system comprises: an engine including a plurality of cylinders, each cylinder including a pre-chamber of a pre-chamber ignition system; an emissions control device coupled in an exhaust passage of the engine; and a controller storing executable instructions in non-transitory memory that, when executed, cause the controller to: operate each cylinder with a first pre-chamber AFR and a first cylinder AFR during a compression stroke, the first cylinder AFR based on the first pre-chamber AFR; and operate each cylinder with a second pre-chamber AFR during an exhaust stroke, responsive to at least one of an indication of a cold start condition and a temperature of the emissions control device below a threshold temperature of the emissions control device, the second pre-chamber AFR based on the first pre-chamber AFR and the first cylinder AFR. In the preceding example, additionally or optionally, each pre-chamber includes a spark plug, and to operate each cylinder with the first pre-chamber AFR during the compression stroke, the controller includes further instructions stored in non-transitory memory that, when executed, cause the controller to: during the compression stroke of each cylinder, ignite a first air-fuel mixture in the corresponding pre-chamber via the spark plug to initiate combustion of a second air-fuel mixture in the cylinder. In one or both of the preceding examples, additionally or optionally, each cylinder includes a fuel injector, and to operate each cylinder with the second pre-chamber AFR during the exhaust stroke, the controller includes further instructions stored in non-transitory memory that, when executed, cause the controller to: inject an amount of fuel in the cylinder during the exhaust stroke of the cylinder; ignite a third air-fuel mixture in the corresponding pre-chamber via the spark plug during the exhaust stroke of each cylinder. In any or all of the preceding examples, additionally or optionally, the amount of fuel is determined based in part on the first pre-chamber AFR, the first cylinder AFR, and the second pre-chamber AFR. In any or all of the preceding examples, additionally or optionally, the first cylinder AFR is lean relative to stoichiometry, and the first pre-chamber AFR is rich relative to stoichiometry.

In another representation, a method comprises: responsive to a request for catalyst heating, combusting a first pre-chamber air-fuel mixture with a first air-fuel ratio (AFR) in a pre-chamber of a cylinder of an engine during a compression stroke of the cylinder to ignite a first cylinder air-fuel mixture with a second AFR in the cylinder; and combusting a second pre-chamber air-fuel mixture with a third AFR in the pre-chamber during an exhaust stroke of the cylinder. In the previous example, additionally or optionally, the third AFR is determined based on the first AFR and the second AFR. In one or both of the preceding examples, the method additionally or optionally further comprises determining an amount of post-injection fuel based on the first AFR and the second AFR; and injecting the amount of post-injection fuel in the cylinder during the exhaust stroke of the cylinder. In any or all of the preceding examples, additionally or optionally, combusting the first pre-chamber air-fuel mixture with the first AFR in the pre-chamber of the cylinder of the engine during the compression stroke of the cylinder includes: producing the first pre-chamber air-fuel mixture by injecting a first amount of fuel in the pre-chamber and injecting a first amount of air in the pre-chamber during an intake stroke of the cylinder, the first amount of fuel and the first amount of air determined based on the first AFR; producing a first cylinder air-fuel mixture by injecting a second amount of fuel in the cylinder during the intake stroke of the cylinder, the second amount of fuel based in part on the second AFR; igniting the first pre-chamber air-fuel mixture via a spark plug to generate flames during the compression stroke of the cylinder; and igniting the first cylinder air-fuel mixture via the flames from the pre-chamber during the compression stroke of the cylinder. In any or all of the preceding examples, additionally or optionally, the request for catalyst heating is responsive to a temperature of a catalyst less than a threshold temperature of a catalyst. In any or all of the preceding examples, additionally or optionally, the request for catalyst heating is responsive to exceeding a threshold number of engine cycles after engine start. In any or all of the preceding examples, additionally or optionally, the first AFR is rich relative to stoichiometry, and the third AFR is lean relative to stoichiometry.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a cold start condition, injecting a first amount of post-injection fuel in a pre-chamber and a second amount of post-injection fuel in a cylinder during an exhaust stroke of the cylinder to heat a catalyst, the first amount based on an air-fuel ratio (AFR) of a first pre-chamber air-fuel mixture and the second amount based on an AFR of a first cylinder air-fuel mixture;
combusting the first pre-chamber air-fuel mixture in the pre-chamber during a compression stroke of the cylinder to ignite the first cylinder air-fuel mixture; and
combusting a second pre-chamber air-fuel mixture in the pre-chamber, including the first amount of post-injection fuel, during the exhaust stroke of the cylinder to ignite the second amount of post-injection fuel injected in the cylinder.

2. The method of claim 1, wherein combusting an air-fuel mixture in the pre-chamber of the cylinder includes:
delivering air for the air-fuel mixture via a pre-chamber air injector;
delivering fuel for the air-fuel mixture via a pre-chamber fuel injector; and
igniting the air-fuel mixture via a pre-chamber spark plug.

3. The method of claim 1, wherein injecting the second amount of post-injection fuel in the cylinder during the exhaust stroke of the cylinder includes delivering fuel for a post injection via a cylinder fuel injector.

4. The method of claim 1, wherein the AFR of exhaust gas from each combustion cycle is substantially stoichiometric.

5. The method of claim 1, wherein the AFR of the first pre-chamber air-fuel mixture is rich relative to the AFR of the first cylinder air-fuel mixture.

6. The method of claim 1, wherein the cold start condition is indicated following a threshold number of engine cycles after an engine start.

7. The method of claim 1, wherein the cold start condition is indicated responsive to a number of crankshaft revolutions after an engine start increasing above a threshold number of crankshaft revolutions after the engine start.

8. The method of claim 1, wherein the cold start condition is indicated responsive to a catalyst temperature of the catalyst decreasing below a threshold catalyst temperature.

9. A method, comprising:
responsive to an engine start, operating a cylinder with a first pre-chamber air-fuel ratio (AFR) and a first cylinder AFR during a compression stroke of the cylinder; and
responsive to exceeding a threshold number of engine cycles after the engine start, operating the cylinder with a second pre-chamber AFR and a second cylinder AFR during the compression stroke of the cylinder, the second cylinder AFR based on the second pre-chamber AFR, the second pre-chamber AFR rich relative to the first pre-chamber AFR, and the second cylinder AFR lean relative to the first cylinder AFR; wherein operating the cylinder with the second pre-chamber AFR and the second cylinder AFR during the compression stroke includes:
- producing a first air-fuel mixture in the pre-chamber by injecting a first amount of fuel in the pre-chamber and injecting a first amount of air in the pre-chamber during an intake stroke of the cylinder, the first amount of fuel and the first amount of air determined based on the second pre-chamber AFR;
- producing a second air-fuel mixture in the cylinder by injecting a second amount of fuel in the cylinder during the intake stroke of the cylinder, the second amount of fuel based in part on the second cylinder AFR;
- igniting the first air-fuel mixture in the pre-chamber via a spark plug to generate flames during the compression stroke of the cylinder; and
- igniting the second air-fuel mixture in the cylinder via the flames from the pre-chamber during the compression stroke of the cylinder.

10. The method of claim 9, wherein the second pre-chamber AFR is rich relative to stoichiometry, and the second cylinder AFR is lean relative to stoichiometry.

11. The method of claim 9, further comprising:
responsive to exceeding the threshold number of engine cycles after the engine start, injecting a third amount of fuel in the cylinder and operating the pre-chamber with a third pre-chamber AFR during an exhaust stroke of the cylinder, the third amount of fuel based on the second pre-chamber AFR, the second cylinder AFR, and the third pre-chamber AFR.

12. The method of claim 11, wherein operating the pre-chamber with the third pre-chamber AFR during the exhaust stroke of the cylinder includes:
- determining the third pre-chamber AFR based in part on the second pre-chamber AFR;
- producing a third air-fuel mixture in the pre-chamber by injecting a fourth amount of fuel in the pre-chamber and injecting a second amount of air in the pre-chamber during the exhaust stroke of the cylinder, the fourth amount of fuel and the second amount of air determined based on the third pre-chamber AFR; and
- injecting a second amount of air in the pre-chamber during an exhaust stroke of the cylinder, the second amount of air determined based on the second pre-chamber AFR and the second cylinder AFR.

13. The method of claim 9, wherein an AFR of exhaust gas from operating the cylinder with the second pre-chamber AFR and the second cylinder AFR is stoichiometric.

14. A system, comprising:
- an engine including a plurality of cylinders, each cylinder including a pre-chamber of a pre-chamber ignition system and a fuel injector, wherein each pre-chamber comprises a spark plug and at least one unrestricted opening fluidly coupling an interior of the pre-chamber to an interior of a cylinder;
- an emissions control device coupled in an exhaust passage of the engine; and
- a controller storing executable instructions in non-transitory memory that, when executed, cause the controller to:
  - operate each cylinder with a first pre-chamber AFR and a first cylinder AFR during a compression stroke, the first cylinder AFR based on the first pre-chamber AFR;
  - ignite a first air-fuel mixture in a corresponding pre-chamber via the spark plug to initiate combustion of a second air-fuel mixture in the cylinder during the compression stroke of each cylinder;
  - operate each cylinder with a second pre-chamber AFR and a second cylinder AFR during an exhaust stroke via a post-injection into each of the pre-chamber and the cylinder, responsive to at least one of an indication of a cold start condition and a temperature of the emissions control device below a threshold temperature of the emissions control device to heat the emissions control device, the second pre-chamber AFR and the second cylinder AFR based on the first pre-chamber AFR and the first cylinder AFR;
  - inject an amount of fuel in the cylinder during the exhaust stroke of the cylinder; and
  - ignite a third air-fuel mixture in the corresponding pre-chamber via a spark plug during the exhaust stroke of each cylinder.

15. The system of claim 14, wherein the amount of fuel is determined based in part on the first pre-chamber AFR, the first cylinder AFR, and the second pre-chamber AFR.

16. The system of claim 14, wherein the first cylinder AFR is lean relative to stoichiometry, and the first pre-chamber AFR is rich relative to stoichiometry.

* * * * *